(12) United States Patent
Oberheide et al.

(10) Patent No.: US 9,930,060 B2
(45) Date of Patent: Mar. 27, 2018

(54) METHOD FOR ENFORCING ENDPOINT HEALTH STANDARDS

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 15/139,545

(22) Filed: Apr. 27, 2016

(65) Prior Publication Data

US 2016/0350539 A1 Dec. 1, 2016

Related U.S. Application Data

(60) Provisional application No. 62/169,254, filed on Jun. 1, 2015.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 63/08* (2013.01); *H04L 63/20* (2013.01); *H04L 63/168* (2013.01); *H04L 2463/082* (2013.01)

(58) Field of Classification Search
CPC ............... H04L 63/1433; G06F 21/577
See application file for complete search history.

(56) References Cited

U.S. PATENT DOCUMENTS

| 571,282 A | 11/1896 | Pell |
| 6,311,272 B1 | 10/2001 | Gressel |
| 6,823,359 B1 | 11/2004 | Heidingsfeld et al. |
| 6,934,858 B2 | 8/2005 | Woodhill |
| 6,996,716 B1 | 2/2006 | Hsu |
| 7,340,600 B1 | 3/2008 | Corella |
| 7,386,720 B2 | 6/2008 | Sandhu et al. |
| 7,447,784 B2 | 11/2008 | Eun |

(Continued)

OTHER PUBLICATIONS

Yao, Qiong; Sun, Peng; Hu, Linlin; Zhu, Xiaoyong; Ni, Hong; "Effective Iframe-based Strategy for Processing Dynamic Data in Embedded Browser", International Conference on Advanced Computer Theory and Engineering (ICACTE), IEEE, Dec. 20-22, 2008, pp. 538-542.*

(Continued)

*Primary Examiner* — Victor Lesniewski
(74) *Attorney, Agent, or Firm* — Jeffrey Schox; Padowithz Alce

(57) ABSTRACT

An approach for enforcing standards regarding security vulnerabilities for an endpoint user device associated with a user includes collecting, at an inline frame implemented with a web application, endpoint health data of the endpoint user device in response to the user interfacing with the web application through the endpoint user device, generating endpoint health intelligence from the endpoint health data, the endpoint health intelligence indicating endpoint security health of the endpoint user device, generating a first endpoint health notification comprising the endpoint health intelligence, and notifying an administrator of network with the first endpoint health notification.

25 Claims, 9 Drawing Sheets

(56) References Cited

U.S. PATENT DOCUMENTS

| | | |
|---|---|---|
| 7,463,637 B2 | 12/2008 | Bou-Diab et al. |
| 7,496,662 B1* | 2/2009 | Roesch ............... H04L 63/1433 709/223 |
| 7,574,733 B2 | 8/2009 | Woodhill |
| 7,793,110 B2 | 9/2010 | Durfee et al. |
| 7,982,595 B2 | 7/2011 | Hanna et al. |
| 8,001,610 B1 | 8/2011 | Chickering et al. |
| 8,136,148 B1* | 3/2012 | Chayanam ............. G06F 21/31 713/183 |
| 8,161,527 B2 | 4/2012 | Curren |
| 8,181,253 B1 | 5/2012 | Zaitsev et al. |
| 8,185,962 B2 | 5/2012 | Moore |
| 8,281,403 B1* | 10/2012 | Asheghian ............ G06F 11/008 705/400 |
| 8,332,627 B1 | 12/2012 | Matthews et al. |
| 8,397,212 B2 | 3/2013 | Chijiiwa |
| 8,402,526 B2 | 3/2013 | Ahn |
| 8,458,308 B1 | 6/2013 | Steves |
| 8,495,720 B2 | 7/2013 | Counterman |
| 8,499,339 B2 | 7/2013 | Chao et al. |
| 8,510,820 B2* | 8/2013 | Oberheide .......... H04L 63/0272 709/203 |
| 8,538,028 B2 | 9/2013 | Yeap et al. |
| 8,539,567 B1 | 9/2013 | Logue et al. |
| 8,578,162 B2 | 11/2013 | Jentzsch et al. |
| 8,646,060 B1 | 2/2014 | Ayed |
| 8,737,623 B2 | 5/2014 | Hart |
| 8,745,703 B2 | 6/2014 | Lambert et al. |
| 8,891,772 B2 | 11/2014 | D'Souza et al. |
| 8,949,927 B2 | 2/2015 | Arnott et al. |
| 9,049,011 B1 | 6/2015 | Agrawal |
| 9,049,594 B2 | 6/2015 | Chen et al. |
| 9,122,888 B2 | 9/2015 | Devi |
| 9,135,458 B1 | 9/2015 | Hankins, Jr. et al. |
| 9,203,841 B2 | 12/2015 | Neuman et al. |
| 9,223,961 B1* | 12/2015 | Sokolov ................. G06F 21/51 |
| 9,253,185 B2 | 2/2016 | Alaranta et al. |
| 9,258,296 B2 | 2/2016 | Juthani |
| 9,282,085 B2 | 3/2016 | Oberheide et al. |
| 9,338,163 B2 | 5/2016 | Wendling et al. |
| 9,391,980 B1 | 7/2016 | Krahn et al. |
| 9,430,938 B2 | 8/2016 | Proud |
| 2002/0013898 A1 | 1/2002 | Sudia et al. |
| 2002/0136410 A1 | 9/2002 | Hanna |
| 2003/0061506 A1 | 3/2003 | Cooper et al. |
| 2003/0120931 A1 | 6/2003 | Hopkins et al. |
| 2003/0126472 A1 | 7/2003 | Banzhof |
| 2004/0218763 A1 | 11/2004 | Rose et al. |
| 2005/0240522 A1 | 10/2005 | Kranzley et al. |
| 2005/0268107 A1 | 12/2005 | Harris et al. |
| 2005/0278777 A1* | 12/2005 | Loza ...................... H04L 63/20 726/4 |
| 2006/0031938 A1* | 2/2006 | Choi .................... G06F 21/552 726/25 |
| 2006/0059569 A1 | 3/2006 | Dasgupta et al. |
| 2006/0101519 A1* | 5/2006 | Lasswell ............. G06F 21/577 726/25 |
| 2006/0130139 A1 | 6/2006 | Sobel et al. |
| 2006/0184788 A1 | 8/2006 | Sandhu et al. |
| 2006/0195588 A1* | 8/2006 | Pennington ........... G06F 21/53 709/227 |
| 2007/0016948 A1* | 1/2007 | Dubrovsky .......... H04L 63/1433 726/22 |
| 2007/0081667 A1 | 4/2007 | Hwang |
| 2007/0156659 A1 | 7/2007 | Lim |
| 2007/0180490 A1* | 8/2007 | Renzi .................... G06F 21/577 726/1 |
| 2007/0186106 A1 | 8/2007 | Ting et al. |
| 2007/0199060 A1 | 8/2007 | Touboul |
| 2007/0258594 A1 | 11/2007 | Sandhu et al. |
| 2007/0297607 A1 | 12/2007 | Ogura et al. |
| 2008/0040790 A1 | 2/2008 | Kuo |
| 2008/0059474 A1 | 3/2008 | Lim |
| 2008/0069347 A1 | 3/2008 | Brown et al. |
| 2008/0198856 A1* | 8/2008 | Vogel ................. H04L 63/1433 370/395.3 |
| 2008/0215675 A1* | 9/2008 | Kaminitz .......... G06F 17/30861 709/203 |
| 2008/0229104 A1 | 9/2008 | Ju et al. |
| 2008/0229422 A1 | 9/2008 | Hudis et al. |
| 2008/0244724 A1 | 10/2008 | Choe et al. |
| 2009/0077060 A1 | 3/2009 | Sermersheim et al. |
| 2009/0177675 A1* | 7/2009 | Trumbull ............... G06F 21/552 |
| 2009/0178132 A1 | 7/2009 | Hudis et al. |
| 2009/0187986 A1 | 7/2009 | Ozeki |
| 2009/0210705 A1 | 8/2009 | Chen |
| 2009/0271863 A1* | 10/2009 | Govindavajhala .. H04L 63/1433 726/23 |
| 2010/0023781 A1 | 1/2010 | Nakamoto |
| 2010/0042954 A1 | 2/2010 | Rosenblatt et al. |
| 2010/0050263 A1* | 2/2010 | Weisman ............ H04L 63/1433 726/25 |
| 2010/0100725 A1* | 4/2010 | Ozzie ...................... G06F 21/43 713/155 |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0131755 A1 | 5/2010 | Zhu et al. |
| 2010/0216425 A1 | 8/2010 | Smith |
| 2010/0263046 A1* | 10/2010 | Polavarapu ........... G06F 21/552 726/22 |
| 2010/0274859 A1 | 10/2010 | Bucuk |
| 2011/0113484 A1 | 5/2011 | Zeuthen |
| 2011/0119765 A1* | 5/2011 | Hering ................. G06F 21/577 726/25 |
| 2011/0138469 A1 | 6/2011 | Ye et al. |
| 2011/0145900 A1 | 6/2011 | Chern |
| 2011/0185287 A1* | 7/2011 | Dharmarajan .... G06F 17/30902 715/752 |
| 2011/0197267 A1 | 8/2011 | Gravel et al. |
| 2011/0219449 A1 | 9/2011 | St. Neitzel et al. |
| 2011/0289582 A1* | 11/2011 | Kejriwal ............... G06F 21/566 726/22 |
| 2012/0090028 A1 | 4/2012 | Lapsley et al. |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0323950 A1* | 12/2012 | Wilson ............ G06F 17/30389 707/766 |
| 2013/0007848 A1 | 1/2013 | Chaskar et al. |
| 2013/0042002 A1 | 2/2013 | Cheeniyil et al. |
| 2013/0055289 A1* | 2/2013 | Maltese .............. H04L 29/0809 719/320 |
| 2013/0060708 A1 | 3/2013 | Oskolkov et al. |
| 2013/0110676 A1 | 5/2013 | Kobres |
| 2013/0117826 A1 | 5/2013 | Gordon et al. |
| 2013/0125226 A1 | 5/2013 | Shah et al. |
| 2013/0174246 A1 | 7/2013 | Schrecker et al. |
| 2013/0191901 A1 | 7/2013 | Black |
| 2013/0239167 A1* | 9/2013 | Sreenivas ............. G06F 21/577 726/1 |
| 2013/0239168 A1* | 9/2013 | Sreenivas ............... G06F 21/57 726/1 |
| 2013/0239177 A1* | 9/2013 | Sigurdson ............. H04L 63/102 726/4 |
| 2013/0246281 A1 | 9/2013 | Yamada et al. |
| 2013/0326224 A1 | 12/2013 | Yavuz |
| 2014/0007238 A1* | 1/2014 | Magee ................... G06F 21/577 726/24 |
| 2014/0019752 A1 | 1/2014 | Yin et al. |
| 2014/0032449 A1 | 1/2014 | Kacin et al. |
| 2014/0047546 A1 | 2/2014 | Sidagni |
| 2014/0189863 A1* | 7/2014 | Rorabaugh ........... G06F 21/577 726/22 |
| 2014/0201841 A1 | 7/2014 | Deshpande et al. |
| 2014/0244993 A1 | 8/2014 | Chew |
| 2014/0245396 A1 | 8/2014 | Oberheide et al. |
| 2014/0376543 A1* | 12/2014 | Malatack ............ H04M 7/0036 370/352 |
| 2015/0040194 A1 | 2/2015 | Chaskar et al. |
| 2015/0058983 A1* | 2/2015 | Zeitlin ................. H04L 63/1408 726/23 |

(56) References Cited

U.S. PATENT DOCUMENTS

| | | |
|---|---|---|
| 2015/0213259 A1* | 7/2015 | Du .................... H04L 63/1466 726/27 |
| 2015/0237026 A1 | 8/2015 | Kumar |
| 2016/0004868 A1 | 1/2016 | Robke et al. |
| 2016/0056962 A1 | 2/2016 | Mehtala |
| 2016/0164866 A1 | 6/2016 | Oberheide et al. |
| 2016/0180072 A1 | 6/2016 | Ligatti et al. |
| 2016/0286391 A1 | 9/2016 | Khan |
| 2016/0314301 A1* | 10/2016 | Johns .................... G06F 21/577 |

OTHER PUBLICATIONS

Stone-Gross, Brett; Cova, Marco; Kruegel, Christopher; Vigna, Giovanni; "Peering Through the iFrame", INFOCOM Proceedings, IEEE, Apr. 10-15, 2011, pp. 411-415.*
Symantec, Administration guide for symantec Endpoint protection and symantec network access control, 2009, version 11.00.05.00.00.
Edge, Kenneth, et al. "The use of attack and protection trees to analyze security for an online banking system." System Sciences, 2007. HICSS 2007. 40th Annual Hawaii International Conference on. IEEE, 2007.
Neuenhofen, Kay, and Mathew Thompson. "A secure marketplace for mobile jaya agents." Proceeding of the second international Conference on Autonomous agents. ACM, 1998. (pp. 212-218).

* cited by examiner

| Dashboard | Authentication Log | | | |
|---|---|---|---|---|
| Policy | | | | |
| | When<br>Today<br>06:13 PM | Who<br>iOS | What<br>Authentication<br>developer-web | Access<br>Mac OS X 10.10.2<br>Chrome 40.0.2214<br>192.0.2.1 |
| Integrations | | | | |
| Users | | | | |
| Devices | When<br>Today<br>06:12 PM | Who<br>iOS | What<br>Authentication<br>developer-web | Access<br>Mac OS X 10.10.1<br>Safari 8.0.3<br>192.0.2.2 |
| Groups | | | | |
| Logs<br>   Access Insight<br>   Auth. Log<br>   Telephony Log<br>   Admin. Actions | When<br>Today<br>06:10 PM | Who<br>iOS | What<br>Authentication<br>developer-web | Access<br>Mac OS X 10.10.2<br>Chrome 40.0.2214<br>192.0.2.1 |
| Accounts | | | | |
| Settings | | | | |
| Billing | | | | |

FIGURE 6

Custom Policies

To enforce different policies on different integrations, create a custom policy and assign it to those integrations. Policy settings in a custom policy will override anything set in your default policy.

Sensitive Data

◆ Authentication Methods
Only Allow: Duo Push, Duo Mobile passcodes

◆ Platforms And Versions
Only Allow: iOS, Android

◆ Browsers
Only Allow: Google Chrome (>=v42)

This policy is not in use by any integrations yet.

FIGURE 7

✓ Tom G successfully logged into Salesforce 2 hours ago from Ann Arbor MI

General:
| User | Brian Lao |
|---|---|
| Type | Authentication |
| Integration | Salesforce |
| Time | Yest. 04:55PM |

Device:
| OS | Mac OS X 10.10.1 |
|---|---|
| Browser | Chrome 40.0.2214 |
| IP Address | 50.34.123.435 |
| Location | Ann Arbor, MI USA |

Authenticator:
| Type | Duo Push |
|---|---|
| Device | (248) 748-1234 |
| IP Address | 50.34.123.435 |
| Location | Ann Arbor, MI |

⚠ This authentication has been flagged as potentially malicious
- The Device IP is from a known Tor exit node
- The Authenticator IP is from a known Tor exit node

FIGURE 8

METHOD FOR ENFORCING ENDPOINT HEALTH STANDARDS

CROSS-REFERENCE TO RELATED APPLICATIONS

This application claims the benefit of U.S. Provisional Application No. 62/169,254 filed 1 Jun. 2015, which is incorporated in its entirety by this reference.

TECHNICAL FIELD

This invention relates generally to the authentication field, and more specifically to a new and useful method for enforcing endpoint health standards.

BACKGROUND

Passwords are easily phished, captured, replayed, or otherwise compromised. To address weaknesses in passwords, two-factor authentication was developed. Multi-factor authentication (MFA) is commonly deployed for sensitive applications (e.g., email, web apps, VPN) by system administrators in order to better safeguard corporate data. Unfortunately, even with a well-implemented two-factor authentication scheme, sensitive data or networks may be compromised if network endpoints are exposed to attack.

Network endpoints (e.g., a user's smartphone or laptop) may be compromised in a number of ways; in particular, vulnerabilities in operating systems, internet browsers, and plug-ins may lead to serious breaches in security. Traditionally, this issue has been dealt with by mandating installation of a host agent (e.g., a software program operating on a system that scans the system for vulnerabilities), but this solution has a number of issues. In particular, it is difficult to ensure compliance (that is, that a host agent has been installed and is up-to-date on every endpoint accessing the network) across the myriad devices in use on a computer network. Thus, there is a need in the authentication field to create a new and useful method for enforcing endpoint health standards. This invention provides such a new and useful method.

BRIEF DESCRIPTION OF THE FIGURES

FIG. 6 is an example view of an administrator panel;

FIG. 7 is an example view of an administrator panel;

FIG. 8 is an example view of an administrator notification; and

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 2:
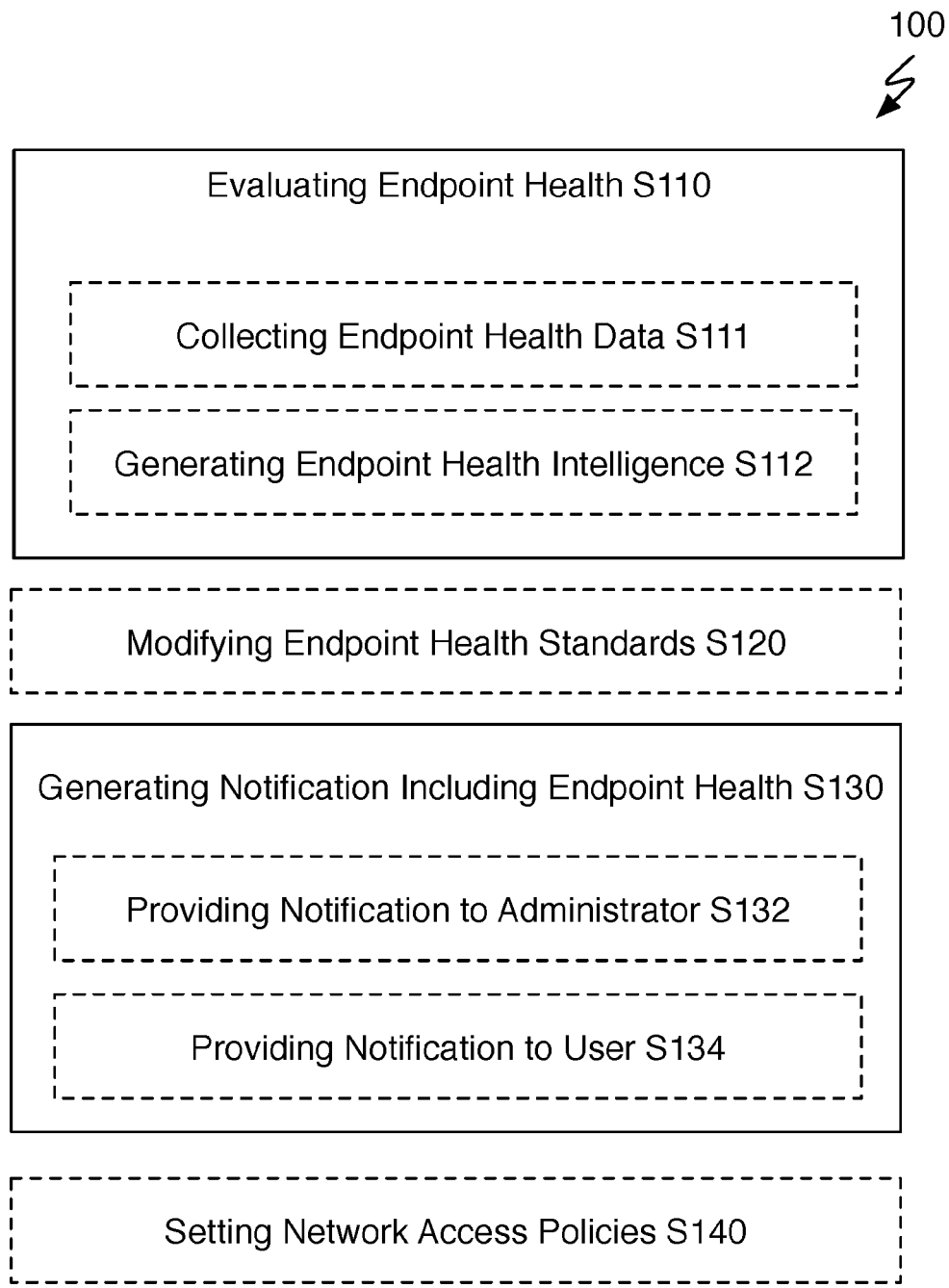
FIG. 2 is a flow diagram view of a method of a preferred embodiment.

As shown in FIG. 2, a method 100 for enforcing endpoint health standards includes evaluating endpoint health S110 and generating an endpoint health notification S120. The method 100 may additionally or alternatively include setting network access policies S140.

The method 100 functions to enable the enforcement of endpoint health standards across network endpoints. The method 100 preferably operates in tandem with existing services on a network used by endpoints accessing the network; for example, the method 100 may be associated with existing services required for network access (e.g., multi-factor authentication) such that any endpoint that accesses the network must pass an endpoint health evaluation.

The method 100 preferably enforces endpoint health standards by first evaluating endpoint health (S110) by collecting endpoint health data from devices connecting to or attempting to connect to a network (S111) and generating health intelligence reports (S112) from that data. After endpoint health intelligence has been generated, it is preferably provided to administrators (S132) to enable enforcement of network policies (e.g., whether and how devices are allowed to connect to the network); additionally or alternatively, endpoint health intelligence may be provided directly to endpoint users (S134) and/or may be used to automatically set network access policies for endpoints (S140).

Network endpoints preferably include any device used to access information on a network; for example, desktop computers, laptop computers, tablets, and smartphones. Other examples of network endpoints include computer servers, bar code readers, kiosks, and point of sale (POS) terminals.

The method 100 is preferably implemented by an endpoint health service operated by or in tandem with one or more authentication services operating on a computer network. Both the authentication services and the endpoint health service are preferably cloud-based (e.g., they are used to enable network access on a LAN, but are actually run on cloud-based servers), but may additionally or alternatively be local-network-based or even locally based. Additionally or alternatively, any portion of the method 100 can be performed by a user, an administrator of a network, a device associated with a user, a device associated with an administrator, and/or any suitable component. The method 100 may additionally or alternatively be implemented by any suitable computing device in any suitable manner.

Figure 1:
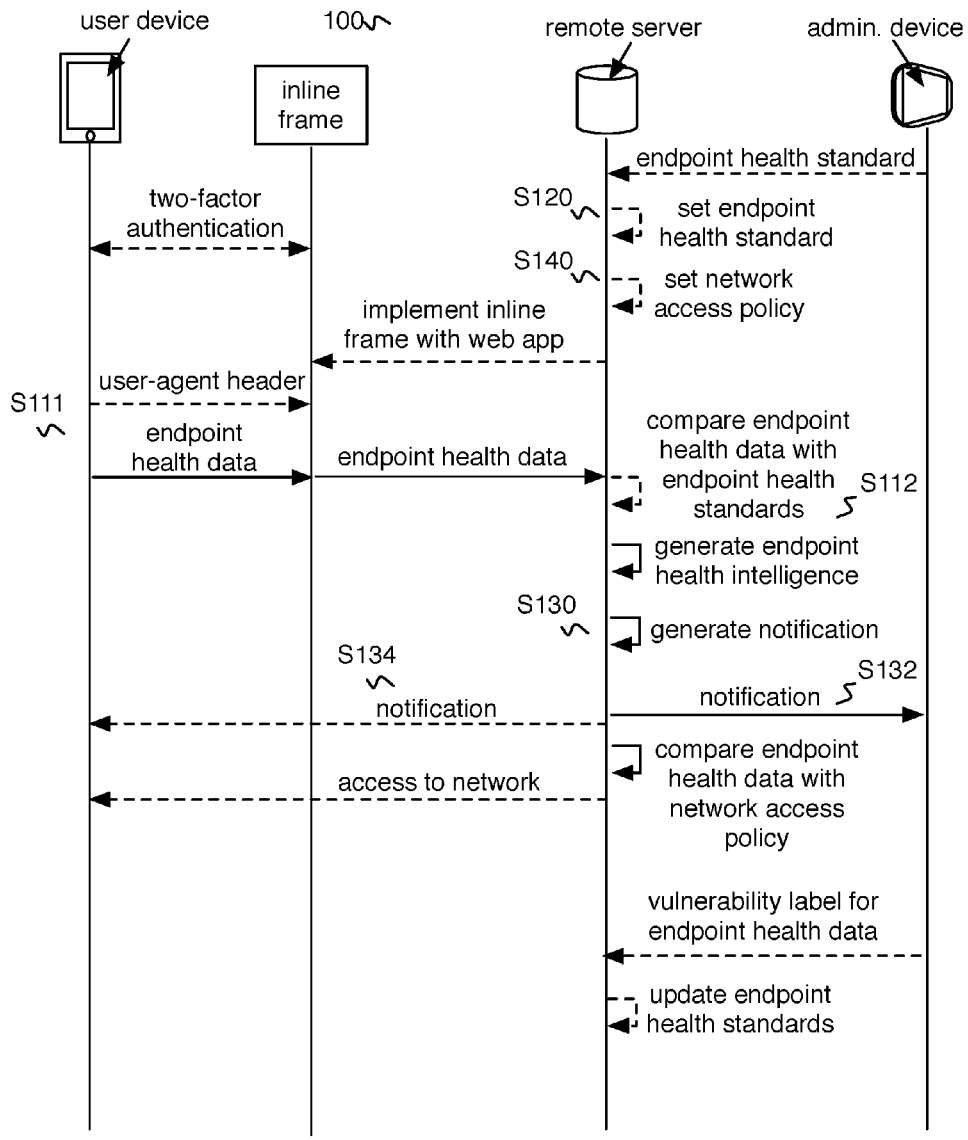
FIG. 1 is a flow diagram view of a method of a preferred embodiment.

As shown in FIG. 1, in an implementation of a preferred embodiment of the method 100, an approach for enforcing standards regarding security vulnerabilities for an endpoint user device associated with a user includes: collecting, at an inline frame implemented with a web application, endpoint health data of the endpoint user device in response to the user interfacing with the web application through the endpoint user device; generating endpoint health intelligence from the endpoint health data, the endpoint health intelligence indicating endpoint security health of the endpoint user device; generating an endpoint health notification comprising the endpoint health intelligence; and notifying an administrator of a network with the endpoint health notification.

2. Benefits

In specific examples, the method 100 can confer several benefits over conventional methodologies for enforcing endpoint health standards. The method 100 can be seamlessly integrated with a current service or network. For example, the method 100 can be implemented on the front-end through a web application's inline frame used for two-factor authentication to a service. The same inline frame can perform authentication and collection of endpoint health data of an endpoint user device. As such, the method 100 can allow the endpoint health enforcement to be a natural extension of already-implemented processes (e.g., a two-factor authentication service) without requiring manual addition of endpoint health enforcement services to a network or endpoint user device by users or administrators. Such approaches can facilitate endpoint health while enabling (1) increased user compliance, (2) enforcement of endpoint health standards for all endpoint user devices attempting to access a service or a network, and (3) seamless integration with services without affecting user experience.

Further, the method 100 can facilitate improvements in the functioning of endpoint user devices and networks by addressing potential vulnerabilities and increasing security (e.g., automatically in response to identified vulnerabilities of endpoint user devices, through notifying administrators of vulnerabilities, etc.). These benefits can be achieved in real-time, as the method 100 can facilitate the real-time generation and transmission of time-sensitive information relevant to the security of endpoint user devices and networks. Such generation and transmission of information can prevent imminent attacks on networks and services, thereby providing solutions to issues specifically arising with computer networks, namely the security vulnerabilities of endpoint user devices accessing the network.

3. Method 3.1 Evaluating Endpoint Health

Step S110 includes evaluating endpoint health. Step S110 functions to determine whether an endpoint (or a group of endpoints) meets endpoint health standards. As shown in FIGS. 1 and 2, Step S110 preferably includes collecting endpoint health data S111 and generating endpoint health intelligence S112. Step S110 may additionally or alternatively include modifying endpoint health standards S120.

3.1.A Collecting Endpoint Health Data

Step S111 includes collecting endpoint health data. Step S111 functions to collect data from endpoints that can be used to evaluate any potential security vulnerabilities. Endpoint data collected by Step S111 preferably includes presence and operation details (e.g., version number) of potentially vulnerable applications or other programs operating on an endpoint; for example, operating systems, internet browsers, plug-ins (e.g., Java, Flash), office suite software (e.g., iWork, Microsoft Office), document readers (e.g., Adobe Acrobat), and connectivity software (e.g., VPN apps).

Endpoint health data may additionally or alternatively include any data relating to security vulnerabilities on an endpoint, including data relating to endpoint hardware. For example, endpoint health data may include network traffic or other data produced during endpoint operation; this data may be analyzed to determine potential vulnerabilities. As another example, collecting the endpoint health data can include performing digital fingerprinting of an endpoint user device in order to collect hardware properties of the endpoint user device, where the endpoint health data can include the hardware properties. Hardware properties of a device can include one or more of: battery properties (e.g., battery type, battery life, state of charge, etc.), processor characteristics (e.g., processor speed, etc.), display characteristics, allowed user interface actions, storage, weight, sensor properties (e.g., location sensors, motion sensors, etc.), hardware type (e.g., mobile phone, laptop, computer, tablet, smart watch, etc.) communication properties (e.g., Bluetooth enabled, wireless transceiver information, etc.), and/or any other suitable hardware properties of devices.

In a variation of Step S111, endpoint health data is collected in an agentless fashion. For example, collecting endpoint health data can include collecting the endpoint health data without installing an agent on an endpoint user device. As an example, the component (e.g., an inline frame, a proxy server, etc.) collecting endpoint health data can be integrated with a web application used to access a network, or integrated with an inline frame used for multi-factor authentication for a service. Additionally or alternatively, endpoint health data can be collected by an agent installed on a endpoint user device, or in any other manner.

Step S111 preferably includes collecting endpoint health data through an inline frame (henceforth referred to as 'iframe') embedded in a website; this technique is henceforth referred to as 'iframe collection'. Step S111 more preferably includes collecting endpoint health data through an iframe embedded in one or more websites used for multi-factor authentication. Additionally or alternatively, Step S111 may include collecting endpoint health data in any suitable manner, e.g., via a proxy server (henceforth referred to as 'proxy collection'), via a third party (henceforth referred to as 'third party collection'), and/or via a host agent (henceforth referred to as 'host agent collection').

3.1.A.i Collecting Endpoint Health Data—Inline Frame Collection.

Collecting endpoint health data can additionally or alternatively include collecting, at an iframe, endpoint health data of the endpoint user device, which functions to collect data of an endpoint device at an iframe.

Collection of endpoint health data through an iframe embedded in a website enables endpoint health data to be captured whenever an endpoint user (or automated program running on an endpoint) interfaces with the website. For example, endpoint health data can be collected at an iframe in response to the user interfacing with the web application through the endpoint user device. The iframe can be embedded in a web application (e.g., a website, an application accessible over the Internet, an application facilitating direct interfacing with the user in an interactive manner, etc.), a native application, and/or any suitable software. The iframe can include resources that are presentable in Silverlight, Flash, HTML 5, and/or any suitable media and/or multimedia player/plug-in. The iframe can include a block element such as a DIV, SPAN, or other HTML tag, embedded object, and/or any other suitable element.

While iframe collection preferably includes collecting data using an HTML iframe object, Step S111 may additionally or alternatively include any endpoint health data collection through a web interface. For example, Step S111 may include performing an HTTP redirect to first send users desiring network authentication to a site designed to collect endpoint health data before allowing the user to continue with network authentication. As another example, Step S111 may include simply collecting endpoint health data as part of a web application; that web application forwarding the endpoint health data to an endpoint health monitoring service (e.g., via a REST API). However, collecting endpoint health data can be performed at any suitable embeddable interface with any suitable host for the embedded interface.

The iframe is preferably embedded in a website used for authenticating a user for access to a computer network; for example, the iframe may be embedded in a website used to access a computer network from outside the physical network (e.g., via VPN). In another example, collecting the first endpoint health data can include collecting the first endpoint health data in response to the first endpoint user device attempting to access the first network from the web application. Using iframe collection in a website required for network access ensures that devices accessing the network may be subject to health standard enforcement. Additionally or alternatively, the iframe may be embedded in any website.

iframe collection preferably includes collecting web browser agent data (e.g., by collecting HTTP user-agent header data). A user-agent header might read as follows: Mozilla/5.0 (Macintosh; Intel Mac OS X 10_9_3) AppleWebKit/537.750.14 (KHTML, like Gecko) Version/7.0.3 Safari/7046A194A. Such a user-agent header could be used to determine the operating system, operating system version, browser, and browser version of an endpoint accessing the embedded iframe. However, any suitable endpoint health data can be collected at one or more iframes. iframe collection can also includes performing device fingerprinting (e.g., canvas fingerprinting). Device fingerprinting may include collecting data such as client TCP/IP configuration, OS fingerprint, wireless settings, hardware clock skew, client MAC address, etc. However, any suitable endpoint health data can be collected at an iframe.

An iframe can be associated with any number of web applications, networks, network administrators, and/or other suitable entity. For example, the method 100 can include collecting, at an iframe (e.g., the same iframe used for collecting first endpoint health data of a first endpoint user device associated with a first network), second endpoint health data of a second endpoint user device in response to a second user interfacing with the web application through the second endpoint user device; generating second endpoint health intelligence from the second endpoint health data; generating a second endpoint health notification comprising the second endpoint health intelligence; and notifying a second administrator of a second network (e.g., as opposed to the first administrator of a first network) with the second endpoint health notification.

In a first variation, collecting endpoint health data at an iframe can include actively collecting endpoint health data at the iframe. For example, collecting the first endpoint health data can include: querying the endpoint user device from the iframe; and in response to querying the endpoint user device, receiving the endpoint health data from the endpoint user device. Actively collecting endpoint health data at an iframe can include transmitting endpoint health data probes to request endpoint health data from one or more entities including: a third party application operating on the user device, a native application, the user associated with the user device (e.g., transmitting a notification to the user device asking for a response by the user), a service associated with the user device (e.g., a security service, a two-factor authentication service, customer service, communication service, payroll service), a server, another network, and/or any suitable entity. Active collection of endpoint health data can be performed at specified time intervals (e.g., every day, week, month, etc.), under enumerated conditions (e.g., during an authentication process for a user attempting to access a service, when a user device attempts to access a network through a web application with an embedded iframe), manually (e.g., initiated by an administrator, by a user, etc.), and/or in any suitable manner.

In the first variation, iframe collection may additionally or alternatively include performing other web-based interrogation techniques. For example, iframe collection may include querying a navigator.plugins javascript object to detail the plugins installed in the endpoint browser (e.g., Java, Flash, etc.) potentially including version numbers as well. iframe collection may include any method of querying an endpoint through the embedded interface; as another example, iframe collection may be used to determine details about a user's internet connection (e.g., IP address). iframe collection may also include collecting information from locally shared objects (e.g., flash cookies) or from browser plug-ins (e.g., OS plugins for remote support). However, any suitable endpoint health data can be collected with iframe collection. However, actively collecting endpoint health data at the iframe can be otherwise performed.

In a second variation, collecting the endpoint health data at the iframe can include passively collecting endpoint health data at the iframe. Passively collected endpoint health data can include: web browser requests, user credentials (e.g., at an iframe for two-factor authentication), HTTP headers, and/or any other suitable endpoint health data. For example, an HTTP user-agent header can be received at an iframe embedded within a web application, such as when a user device web browser interfacing with the web application sends the HTTP user-agent header along with a request to the iframe. In a specific example, passively collecting endpoint health data can include extracting, at the iframe, the operating system type and operating system version from an HTTP user-agent header, where the endpoint health data includes the operating system type and the operating system version. Additionally or alternatively, the user-agent header can be requested by the iframe. However, passively collecting endpoint health data can be otherwise performed.

In a third variation, iframe collection may leverage the existence of iframes used for performing multi-factor authentication; for example, the Duo Security platform may embed iframes into web applications to enable multi-factor authentication, as described in U.S. Pat. No. 8,510,820, the entirety of which is incorporated by this reference. In such a case, the same embedded frame used for performing multi-factor authentication (or enrolling devices for MFA, managing authentication devices for MFA, providing feedback on MFA processes, etc.) may also be used for collecting endpoint health data. In this way, iframe collection allows endpoint health data to be collected without requiring explicit backend service integration (e.g., RADIUS, LDAP, etc.). Alternatively, different iframes embedded within a same embedded interface host (e.g., a same web application) can be used for collecting endpoint health data and for authentication. In a specific example, the method 100 can include administering, at a second iframe (e.g., where there first iframe is an iframe for collecting the endpoint health data) implemented with the web application, two-factor authentication for a user interfacing with the web application through the endpoint user device. In this specific example, the second iframe can be the same or different from the first iframe. However, any suitable number of iframes possessing any suitable function can be embedded across any suitable number of embedded interface hosts.

In the third variation, collecting endpoint health data at an inline frame can be performed at any suitable time in relation to authentication of an endpoint user device. For example, for an inline frame used for authentication of a user, collecting the endpoint health data can include collecting the endpoint health data during the authentication of the user. Further, using an iframe for authentication and an iframe for collecting endpoint health data can be otherwise performed.

In a fourth variation, the method 100 can additionally or alternatively include implementing an iframe with an embedded interface host (e.g., a web application). Implementation of the iframe can be performed by, for example, an administrator of the web application, a remote server associated with the service collecting the endpoint health data at the line frame, and/or any other suitable entity. In a specific example, the method 100 can include implementing an inline frame with the web application, where the first inline frame is used to authenticate the first user, and where collecting the endpoint health data comprises collecting the first endpoint health data only at the inline frame. In another specific example, the method 100 can include embedding the iframe with a web application used to access a network (e.g., the network in which the administrator is notified with an endpoint health notification comprising endpoint health intelligence of an endpoint user device attempting to access the network through the web application). In a further specific example illustrating agentless collection of endpoint health data, the method 100 can include: implementing an iframe with a web application, wherein the web application is used for access to the network, and wherein collecting the endpoint health data includes collecting the endpoint health data only at the iframe. However, implementing the iframe can be performed in any suitable manner.

3.1.A.ii Collecting Endpoint Health Data—Proxy Collection.

Figure 3:
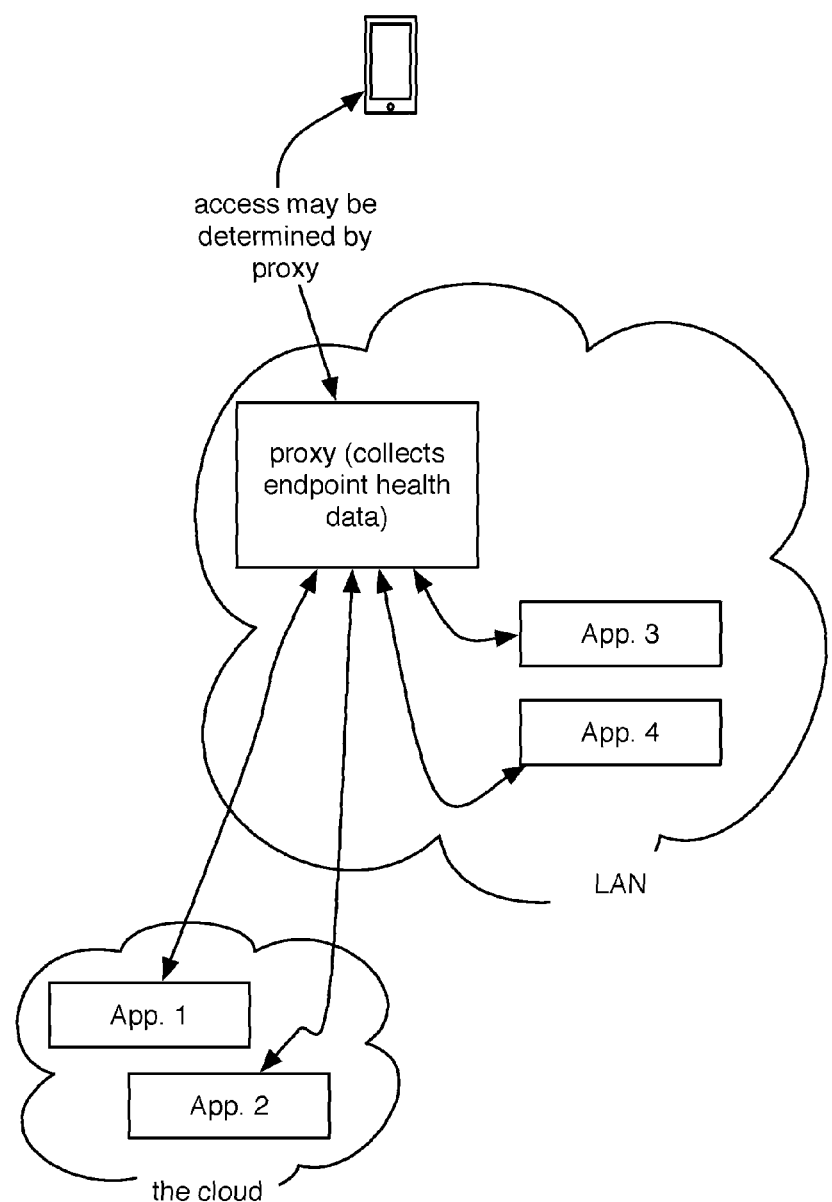
FIG. 3 is a chart diagram view of proxy collection of a method of a preferred embodiment.

As shown in FIG. 3, collecting endpoint health data can additionally or alternatively include collecting, at a proxy service, endpoint health data of the endpoint user device, which functions to collect data of an endpoint device at a proxy service.

In some cases, it may be desirable to perform endpoint health data collection for all devices passing traffic on a network or sub-network (as opposed to devices attempting authorization with a particular application or service). In this case, endpoint health data collection is preferably performed by a proxy service. The proxy service preferably at least collects endpoint health data for devices passing traffic through it, but may additionally or alternatively enforce network access policies for those devices.

Proxy collection may include collecting endpoint health data via HTTP headers or device fingerprinting (as described in the iframe collection section), but may additionally or alternatively include collecting endpoint health data in additional ways; for example, proxy collection may include collecting data on network traffic passing through the proxy, which may be used to determine endpoint health. For example, proxy collection may use network traffic analysis to determine if an endpoint is compromised.

The proxy server used for proxy collection is preferably located on a local area network, but may additionally or alternatively be located in the cloud (or any other suitable location).

The proxy server may simply perform endpoint health data collection, but may additionally or alternatively perform any additional function (e.g., firewalling). However, collecting endpoint health data at a proxy service can be performed in any suitable manner.

3.1.A.iii Collecting Endpoint Health Data—Third Party Collection.

Collecting endpoint health data can additionally or alternatively include collecting endpoint health data of the endpoint user device from a third party application, which functions to collect endpoint health data from a third party source.

Figure 4A:
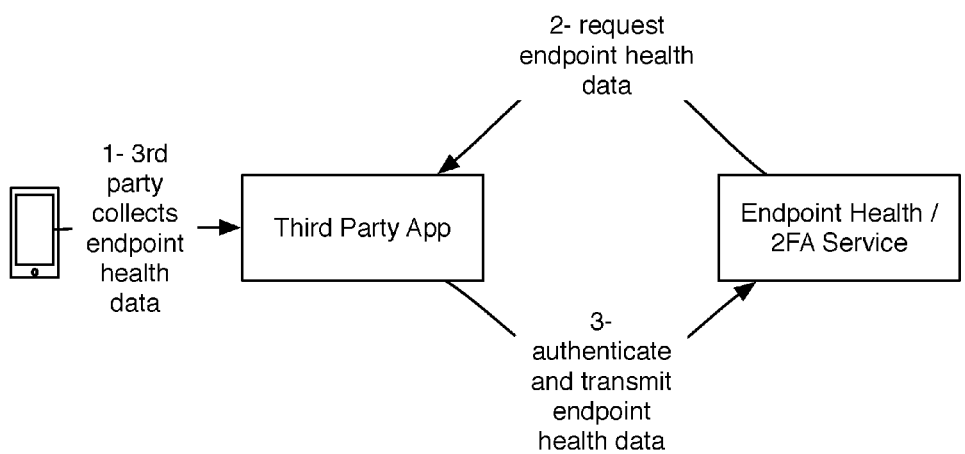
FIGS. 4A and 4B are chart diagram views of third party collection of a method of a preferred embodiment.
Figure 4B:
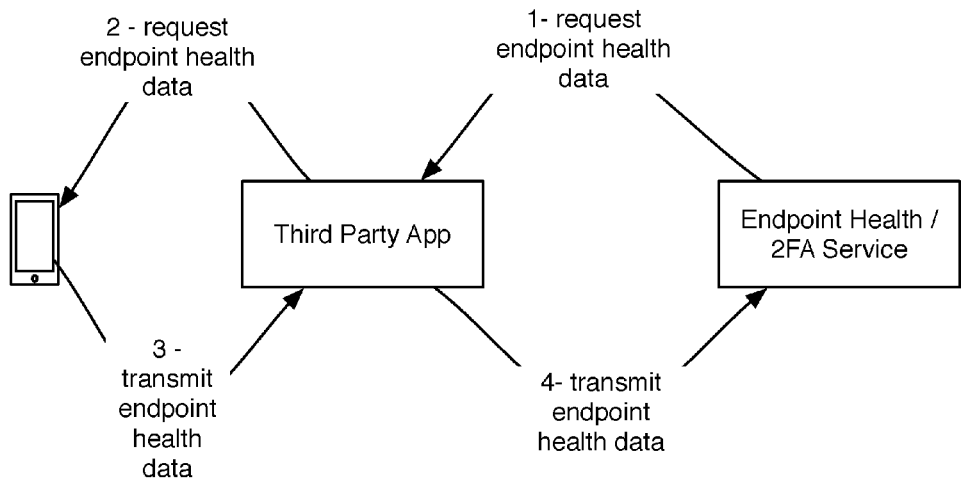

Some endpoint health data may be maintained or accessible by parties other than the endpoint (e.g., external applications), and this data may be accessible to endpoint health monitoring services. In this case, Step S111 may include querying these third parties for endpoint health data, as shown in FIGS. 4A and 4B. In some cases, endpoint health data may be pre-collected by third parties (e.g., as in FIG. 4A), while in other cases endpoint health data may be collected in response to a query (e.g., as in FIG. 4B). In either case, authentication (if required) of the endpoint health service may be performed by either the third party or by the endpoint itself. Third-parties can be queried by any one or more of: a service (e.g., a two-factor authentication service implemented with the web application that the endpoint user device is accessing), an iframe (e.g., a same iframe discussed in Section 3.1.A.i), an endpoint health service (e.g., a remote server used for generating endpoint health intelligence), and/or any other suitable entity.

Data collected by third-party collection may include any endpoint health data collected by proxy and iframe collection, and may additionally or alternatively include any endpoint health data accessible to the third party (in some cases, more data may be accessible to the third party, particularly if the third party service or application has a host agent installed on the endpoint).

Additionally or alternatively, collecting endpoint health data can include receiving endpoint health data input from a user and/or an administrator. For example, a user can be prompted to input operating system information of the endpoint user device attempting to access a company local area network.

However, third-party collection of endpoint health data can be performed in any other suitable manner.

3.1.A.iv Collecting Endpoint Health Data—Host Agent Collection.

Collecting endpoint health data can additionally or alternatively include collecting, at a host agent, endpoint health data of the endpoint user device, which functions to collect data of an endpoint device at a host agent operating on the endpoint device.

Host agent collection preferably includes collecting endpoint health data from an application or service running on the endpoint. Here, host agent refers to any program or service running on an endpoint that enables collection of endpoint health data (e.g., anti-virus or security software, device management APIs integrated with operating systems, etc.).

Host agent collection may include collecting endpoint health data with a host agent specifically associated with the endpoint health monitoring service operating the method 100, or may additionally or alternatively include collecting endpoint health data through third-party host agents or through device management APIs operating on endpoints.

Endpoint health data collected by host agent collection may include any of the aforementioned endpoint health data, but may additionally or alternatively include information accessible to the host agent but not to external services (e.g., computer usage data, file encryption details, etc.). In one embodiment, host agent collection is supplementary to iframe collection; an endpoint may access the network under a first network access policy without installing the host agent, but may access the network under a second (less restrictive) network access policy after installing the host agent.

Note that while these techniques are described independently, collection of endpoint health data by Step S111 may include any combination of the above techniques. For example, collecting endpoint health data can include collecting data at any one or more of an iframe, a proxy service, by a third party, a host agent, and/or any suitable component. In a specific example, for a set of endpoint user devices associated with a network, endpoint health data of a first endpoint user device can be collected at an iframe of a web application used to access the network. Endpoint health data of a second endpoint user device can be collected at a proxy service monitoring traffic of the second endpoint user device. Endpoint health data of a third endpoint user device can be collected from a host agent installed at the third endpoint user device. Further endpoint health data of each of the first, second, and third endpoint user devices can be collected from third-party applications associated with the user devices. However, any combination of components collecting endpoint health data can be leveraged.

Step S111 preferably collects endpoint health data by storing endpoint health data in a database in the cloud for later analysis. Step S111 may additionally or alternatively include storing endpoint health data in any suitable location (e.g., on servers local to a particular network).

Step S111 may additionally or alternatively include processing endpoint health data to prepare the data for generation of endpoint health intelligence. For example, Step S111 may include averaging or aggregating endpoint health data (e.g., to produce an overall network status report), flagging unexpected/unusual data, and/or appending data. In particular, Step S111 may include appending network identification data. For example, Step S111 may include appending network user information to endpoint health data corresponding to a particular user; e.g., if the collected endpoint health data includes an IP address, that IP address may be linked to a particular user by DHCP or other account records located on network servers (which may be queried in Step S111).

3.2 Generating Endpoint Health Intelligence.

Step S112 includes generating endpoint health intelligence. Step S112 functions to generate data describing endpoint health; Step S112 preferably includes evaluating endpoint health data against endpoint health standards (e.g., comparing endpoint health data to endpoint health standards), but may additionally or alternatively include analyzing endpoint health data in any suitable way to determine endpoint health (e.g., using heuristics).

Endpoint health intelligence preferably indicates endpoint security health of one or more endpoint user devices, but can indicate any other suitable characteristic. Endpoint health intelligence may include reports for specific events (e.g., successful or failed login), specific endpoints, groups of endpoints, the network as a whole, and/or for any other suitable subject. Generating endpoint health intelligence preferably includes generating endpoint health intelligence from endpoint health data (e.g., the endpoint health data collected in Step S111). In an example, generating the endpoint health intelligence includes generating the endpoint health intelligence based on the operating system type and the operating system version. Additionally or alternatively, endpoint health intelligence can be generated based on supplemental information (e.g., information about a user, information about services offered on the network, etc). For example, endpoint health intelligence can be generated from processing endpoint health data of an endpoint user device with information about a user's adherence to timely updating software on the user's various devices. Additionally or alternatively, endpoint health intelligence can be generated based on hardware properties of endpoint user devices. For example, the method 100 can include collecting hardware properties of the endpoint user device; generating an endpoint device profile from the hardware properties; where generating endpoint health intelligence comprises generating endpoint health intelligence from the endpoint device profile. However, endpoint health intelligence can be generated from any suitable information.

Endpoint health standards preferably include criteria that endpoint health data should (or must) meet for particular network policies. Endpoint health standards preferably include acceptable operating system, browser, and plug-in version numbers (i.e., these must be current to within some set of versions established by endpoint health standards), but may additionally or alternatively include any suitable standards based on endpoint health data. Endpoint health standards can include expected endpoint health data (e.g., desirable endpoint health data that reduces security vulnerabilities, etc.), unexpected endpoint health data (e.g., an operating system type that was not expected of endpoint user devices associated with a network), administrator-established standards (e.g., endpoint health standards selected by a network administrator), and/or any other suitable data.

Endpoint health standards may be used simply to notify administrators and/or users of potential vulnerabilities, but may additionally or alternatively be linked to network access policies. As a first example, an endpoint may need to meet a particular set of endpoint health standards in order to access a network or service. As a second example, the level of network access granted to an endpoint may be determined by the class of endpoint health standards met by the endpoint. This will be described in more detail in the sections describing Step S140.

Generating endpoint health intelligence can be performed partially or fully by one or more of: a remote server (e.g., a remote server associated with an iframe collecting endpoint health data), a device associated with a user and/or administrator, and/or any other suitable entity.

Temporally, generating endpoint health intelligence is preferably performed in response to receiving endpoint health data at the component (e.g., a remote server) that generates endpoint health intelligence. For example, in response to collecting endpoint health data at an iframe embedded in a web application, endpoint health intelligence can be generated from such endpoint health data. Additionally or alternatively, endpoint health intelligence can be generated after a threshold (e.g., by size, types of a endpoint health data, endpoint health data across a threshold number of devices, etc.) of endpoint health data is gathered. Generating endpoint health intelligence is preferably generated in real-time (e.g., during an authentication session of an endpoint user device at an iframe used for both authentication and collection of endpoint health data). However, endpoint health intelligence can be generated at any suitable time in any suitable manner.

3.2.A Generating Endpoint Health Intelligence—Comparing Endpoint Health Data to Endpoint Health Standards.

In a first variation, generating endpoint health intelligence can include comparing endpoint health data to endpoint health standards. Specific endpoint health data types (e.g., browser type, browser, version, etc.) can be compared to specific endpoint health standards related to the endpoint health data types. For example, endpoint health data of operating system type and operating system version can be compared to endpoint health standards of an expected operating system type (e.g., an operating system type that an administrator of a network expects users of the network to possess) and an expected operating system version. Additionally or alternatively, endpoint health data profiles (e.g., a profile of the different applications and their versions operating on an endpoint user device) can be compared as a whole to endpoint health standards for such profiles. However, any granularity of endpoint health data can be compared to any granularity of endpoint health standards in generating endpoint health intelligence.

In the first variation, comparing endpoint health data to endpoint health standards can include the extent to which endpoint health standards are satisfied by the endpoint health data. In a specific example, browser type and browser version collected from an HTTP user-agent header received at an iframe can be compared against endpoint health standards specifying browser type "A" and at least browser version "5.3." The collected browser types and versions of endpoint user devices can be compared to the standards, and endpoint health intelligence can be generated based on the comparison. Lack of satisfaction of an endpoint health standard can indicate a security vulnerability of the endpoint user device. For example, generating the endpoint health intelligence can include identifying a security vulnerability associated with the endpoint health data (e.g., based on an endpoint health data property failing to meet an endpoint health standard). Administrators and/or users can be notified of identified vulnerabilities, where an endpoint health notification can include an indication of the security vulnerability. In the first variation, endpoint health intelligence can indicate the number (e.g., number of endpoint health standards not met), type (e.g., type of endpoint health standard not met), degree (e.g., a level of security vulnerability based on the degree to which the endpoint health standards were not met), and/or any suitable characteristic regarding the failure of endpoint health data to meet endpoint health standards. However, comparing endpoint health intelligence and endpoint health standards can be performed in any suitable manner.

3.2.B Generating Endpoint Health Intelligence—Comparing Endpoint Health Data of Multiple Endpoint User Devices.

In a second variation, generating endpoint health intelligence can include generating a comparison between endpoint health data of multiple endpoint user devices. Such user devices can be associated with the same user, with different users, and/or any suitable entity. For example, generating the endpoint health intelligence can include generating a comparison between first endpoint health data of a first endpoint user device and second endpoint health data of a second endpoint user device, where a generated endpoint health notification (e.g., to be used in notifying an administrator of a network in which the first and the second endpoint user devices attempt to access) can include the comparison between the first endpoint health data and the second endpoint health data.

In the second variation, any suitable endpoint health data can be compared across endpoint user devices. For example, the method 100 can include collecting browser type information from a set of endpoint user devices attempting to access a local area network. Endpoint health intelligence can be generated from comparing the browser type information of the multiple devices. This generated intelligence can include, as an illustration, endpoint user device "A" uses browser "a", but 85% of other devices on the network use browser "b." However, any suitable endpoint health intelligence can be generated from comparing endpoint health data of multiple user devices (e.g., differences and/or similarities in software, in hardware, in vulnerability level, in traffic, etc.).

In the second variation, historical endpoint health data of endpoint user devices can be stored (e.g., at a remote server), and such historical data can be used in generating endpoint health intelligence regarding a current endpoint user device (e.g., an endpoint user device currently attempting to access a network). However, generating a comparison between endpoint health data of multiple endpoint user devices can otherwise be performed.

3.2.C Generating Endpoint Health Intelligence—Comparing Endpoint Health Data to Historic Endpoint Health Data.

In a third variation, generating endpoint health intelligence can include generating a comparison between endpoint health data of an endpoint user device, and historic endpoint health data of the same endpoint user device. Endpoint health intelligence generated based on such a comparison can include: version information (e.g., application version upgrades, downgrades, etc.), application type information (e.g., changes in the type of applications present in the applications operating on the endpoint user device, additions of software, deletions of software), hardware information (e.g., hardware upgrades, downgrades, additions of third-party hardware, etc.), and/or any other suitable intelligence. Additionally or alternatively, endpoint health data captured over time for a user (e.g., across user devices associated with the user), can be captured. For example, endpoint health intelligence can be generated based on the addition of new user devices associated with a given user account. However, endpoint health data for one or more of a user device, a user, a network, an administrator, and/or any other suitable component can be compared in generating endpoint health intelligence. However, comparing endpoint health data and historic endpoint health data can be performed in any suitable manner.

3.2.D Generating Endpoint Health Intelligence—Using a Machine Learning Model.

In a fourth variation, generating endpoint health intelligence can include generating endpoint health intelligence using a machine learning model. A machine learning model can be used in generating any suitable endpoint health intelligence. For example, generating endpoint health intelligence can include generating a vulnerability indication (e.g., a level of vulnerability to security breaches of the endpoint user device) using a machine learning model generated from the endpoint health standards, where the vulnerability indication is associated with the endpoint health data (e.g., the endpoint health data collected for an endpoint user device attempting to access the network), and where a generated endpoint health notification can comprise the vulnerability indication. In this example, the method 100 can include receiving, from an administrator of the network, verification of the vulnerability indication (e.g., at a security interface provided to the administrator and accessible over the Internet to view endpoint health notifications); and updating the machine learning model with the endpoint health data and the associated verification of the vulnerability indication. Such updated models can be used in subsequent instances of generating endpoint health intelligence for collected endpoint health data. However, machine learning models for generating endpoint health intelligence can otherwise be updated.

Figure 5:
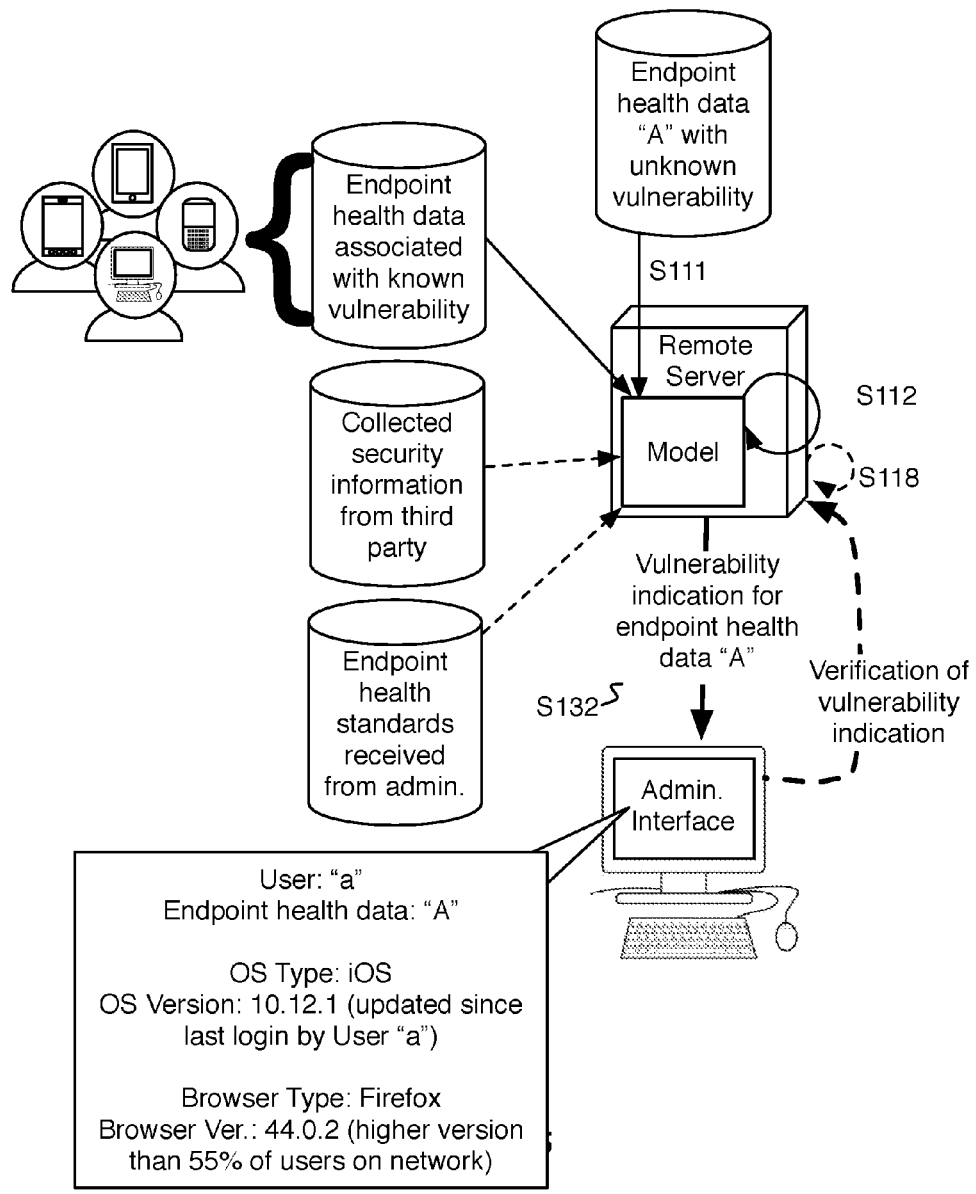
FIG. 5 is a chart diagram view of generating endpoint health intelligence.

In a specific example, as shown in FIG. 5, a machine learning model can be generated from training data including: endpoint health data profiles with known vulnerability (e.g., collected endpoint health data profiles that have been labeled with a vulnerability level by a network administrator), collected security information from a third party (e.g., information indicating known security vulnerabilities associated with certain versions of applications), and endpoint health standards received from an administrator (e.g., expected endpoint health data for the network, unexpected endpoint health data, vulnerability levels associated with such data, etc.), and/or any other suitable training data. Test data can include endpoint health data with unknown vulnerability. Using the generated model, a vulnerability indication and/or any other suitable endpoint health intelligence can be discerned for the endpoint health test data. However, any suitable training and/or test data can be used with a machine learning model.

Step S112 and/or any other suitable portion of the method 100 that can employ machine learning can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 100. Further, any suitable model (e.g., machine learning, non-machine learning, etc.) can be used in generating endpoint health intelligence and/or other data relevant to the method 100.

3.3 Modifying Endpoint Health Standards.

Step S120 includes modifying endpoint health standards. Step S120 functions to modify and/or create endpoint health standards based on endpoint health intelligence and/or other endpoint health data.

Modification of endpoint health standards can be based on information provided by an administrator, by a security provider (e.g., a provider of a two-factor authentication service), by a user, by a third party (e.g., a web browser provider), and/or any other suitable entity. For example, modifying endpoint health standards can include: collecting security information (e.g., from the creator of an application) related to a version of the application operating on the endpoint user device; and updating the endpoint health standards (e.g., expected endpoint health data) based on the security information.

Endpoint health standards can be modified before, during, or after collection of endpoint health data as in Step S111, and/or any other suitable portion of the method 100. For example, endpoint health standards can be updated (e.g., the standards can be made more strict) in real-time in response to generating endpoint health intelligence indicating a high vulnerability risk for an endpoint user device that has recently accessed the network. However, modifying endpoint health standards can be performed at any suitable time.

Endpoint health standards can be modified at a security interface provided to a network administrator, through direct messages (e.g., an administrator responding to a endpoint health notification), automatically (e.g., automatically updating endpoint health standards based on newly generated endpoint health intelligence), manually, and/or through any suitable means.

In a first variation of Step S120, endpoint health standards can be updated based on identified vulnerabilities. In an example, if a previously unknown vulnerability is detected (e.g., by heuristics examining network traffic) and the vulnerability is correlated to a particular set of endpoint health data (e.g., a version of a particular browser), endpoint health standards may be modified automatically to restrict network access for endpoints correlated to that set of endpoint health data (e.g., endpoints running the particular browser version). In a specific example, the method 100 can include: automatically updating the endpoint health standards based on an identified vulnerability correlated to an endpoint health data property, where generating the endpoint health intelligence can include comparing the collected endpoint health data to the endpoint health data property, and where notifying the administrator can include notifying the first administrator of the identified vulnerability in response to the endpoint health data including the endpoint health data property. However, updating endpoint health standards based on identified vulnerabilities can be performed in any suitable fashion.

In a second variation, endpoint health standards can be updated based on flagging of endpoint health data as vulnerable. Network administrators preferably flag endpoint health data as vulnerable or not vulnerable, but any suitable entity can perform the flagging. As an example, an administrator may flag certain endpoints as being vulnerable or compromised. Step S120 may include analyzing endpoint health data from these endpoints and modifying endpoint health standards to restrict network access to endpoints with similar endpoint health data characteristics (alternatively, Step S120 may include simply preparing data to notify an administrator of the similarity in endpoint health data). In a specific example, the method 100 can include receiving, from a network administrator, a flagging of endpoint health data as vulnerable; and automatically updating the endpoint health standards with the endpoint health data and the flagging. Endpoint health standards used by a given network can be updated using a vulnerability flagging of endpoint health data associated with any suitable network. For example, the method 100 can include: receiving, from a second administrator of a first network (e.g., where the first administrator is of a first network), a flagging of the second endpoint health data as vulnerable; and automatically updating the endpoint health standards with the second endpoint health data, where the endpoint health standards can be used in generating endpoint health intelligence for endpoint user devices associated with the first and/or the second network. However, updating the endpoint health standards can be updated based on flagging of endpoint health data in any suitable fashion.

3.4 Generating a Notification

Step S130 includes generating an endpoint health notification, which functions to generate a notification indicating endpoint health of one or more endpoint user devices. The endpoint health notification is preferably generated from the endpoint health intelligence. Additionally or alternatively, the endpoint health notification can include any amount or combination of: endpoint health intelligence, endpoint health standards, endpoint health data, user information, network information, and/or any other suitable information. For example, generating the endpoint health notification can include generating an endpoint health notification including a vulnerability warning, in response to endpoint health data failing to meet and endpoint health standard. The form of endpoint health notifications can include one or more of: verbal content (e.g., endpoint user device "A" is currently using web browser "B", etc.), numerical content (e.g., 80% of users in the network over the past week have used operating system "X" in accessing the network, etc.), graphical content (e.g., a notification highlighted in red to illustrate a high level of security risk for an endpoint user device, etc.), audio content, and/or any other suitable form.

Generating an endpoint health notification is preferably in response to generating endpoint health intelligence. Further, generating the endpoint health notification is preferably performed in real-time (e.g., during a user's attempt to authenticate and access local area network). Additionally or alternatively, endpoint health notifications can be generated at specified time intervals (e.g., every hour, every day, every week, etc.), manually determined (e.g., in response to an administrator requesting endpoint health intelligence), automatically determined (e.g., in response to a vulnerability level of an endpoint user device or a network exceeding a threshold vulnerability level), and/or otherwise generated. However, generating an endpoint health notification can be performed at any suitable time.

Generating an endpoint health notification is preferably performed by the same entity (e.g., a remote server) generating endpoint health intelligence. However, endpoint health notifications can be partially or fully performed by any suitable entity.

Any number of endpoint health notifications can be generated for any number or type of entity. For example, endpoint health notifications can be generated for a network administrator, for a user, for a third party, and/or other suitable entities. In a specific example, the same endpoint health notification is generated for different entities (e.g., a same endpoint health notification for a user and an administrator). However, generating the endpoint health notification can be performed in any suitable fashion.

In a first variation, generated endpoint health notifications can be presented at a security interface for a network administrator and/or user. The security interface can be accessible over the internet (e.g., a web interface), at an application operating on an administrator device, and/or at any suitable component. For example, the method 100 can include providing a security interface to a network administrator, the security interface accessible over the Internet, where notifying the administrator comprises presenting, through a wireless communicable link with an administrator device associated with the administrator, the endpoint health notification at the security interface. However, a security interface for presenting endpoint health notifications can be configured in any suitable fashion.

In a second variation, endpoint health notifications can include response options for administrators, users, and/or other suitable entities receiving a endpoint health notifications. Response options can include options to: update models for generating endpoint health intelligence, verify endpoint health intelligence (e.g., verify the accuracy of endpoint health intelligence), modify endpoint health standards, modify network access policies, update software operating on an endpoint user device, and/or any other suitable option. Response options can be presented at the endpoint health notification, at the security interface, and/or at any suitable component. However, response options for performing actions related to endpoint health can be configured in any suitable manner.

3.5 Notifying an Administrator

Step S132 includes providing endpoint health intelligence to administrators. Step S132 functions to provide administrators (e.g., network administrators, service administrators, etc.) with endpoint health intelligence generated in Step S112. Notifying an administrator preferably includes notifying an administrator of a network with an endpoint health notification generated in Step S130. Additionally or alternatively, other types of notifications can be used in notifying an administrator.

Step S132 preferably includes providing administrators with endpoint health reports in an administrator panel; for example, as shown in the "access" section of FIG. 6. Additionally or alternatively, Step S132 may include providing endpoint health intelligence to administrators in any suitable manner (e.g., sending aggregate report emails once a day, sending push notifications to an administrator's phone upon an unsuccessful network authentication event, etc.).

Step S132 is preferably integrated with an interface that enables administrators to create endpoint health standards and link those standards to specific network access policies; for example, as shown in FIG. 7. Step S132 may additionally or alternatively include providing any endpoint health data (or intelligence generated from endpoint health data) to administrators in any manner.

As previously discussed, endpoint intelligence may include reports for specific events (e.g., successful or failed login), specific endpoints, groups of endpoints, the network as a whole, and/or for any other suitable subjects. For example, an administrator may receive notification of a potential security risk through an interface as shown in FIG. 8. However, notifying an administrator can be performed in any other suitable manner.

3.6 Notifying a User

Step S134 includes providing endpoint health intelligence to endpoint users. Step S134 functions to inform users of endpoint health information; in particular, Step S134 preferably includes informing users if an endpoint is vulnerable, but Step S134 may additionally or alternatively include providing users with any endpoint health information for a given endpoint (or for other endpoints associated with the user). Notifying a user preferably includes notifying the user with an endpoint health notification generated in Step S130. Additionally or alternatively, other types of notifications can be used in notifying a user.

Figure 9:
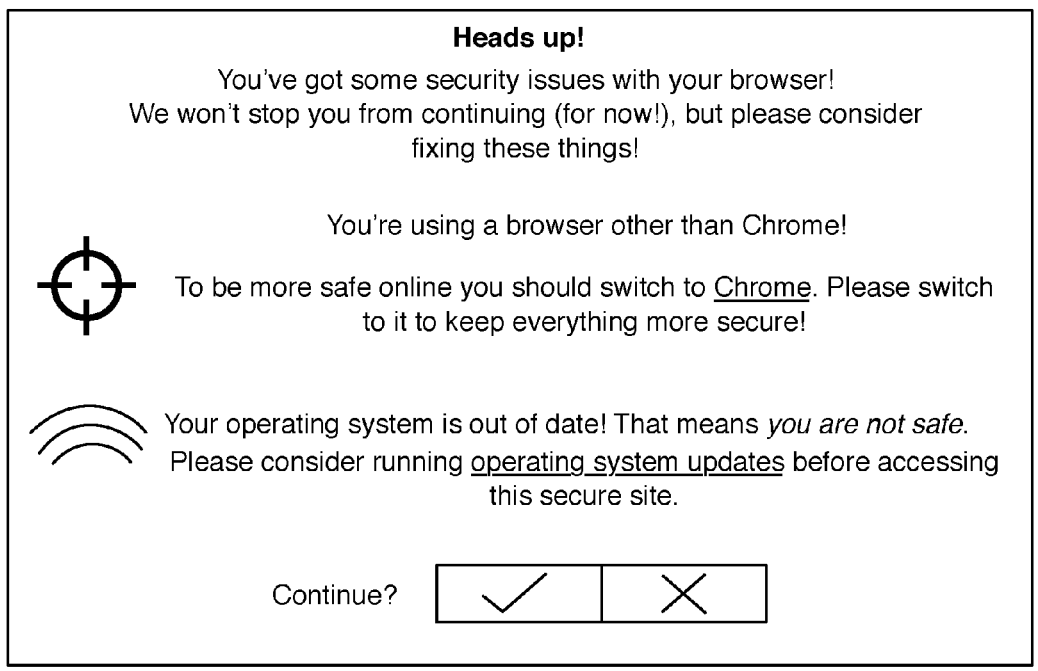
FIG. 9 is an example view of an endpoint notification.

For example, as shown in FIG. 9, Step S134 may include notifying a user if software on the user's endpoint is out of date. Step S134 may additionally or alternatively include providing users with resources to fix vulnerabilities (e.g., links to patches). Step S134 may also include providing users with an option to automatically fix the vulnerability (e.g., the method 100 may include downloading and installing an OS patch at user request) or to request assistance from an administrator or tech support staff member.

In a variation, notifying a user can include notifying a user at the endpoint user device through the iframe. For example, a user can be interfacing with a web application implemented with an iframe that collected endpoint user data and/or performs user authentication. The same iframe can be used to notify a user with an endpoint health notification.

However, notifying a user can be performed in any other suitable manner 3.7 Setting Network Access Policies Step S140 includes setting network access policies. Step S140 functions to set network access policies for endpoints based on how endpoint health data is evaluated relative to endpoint health standards and network access policies associated with those endpoint health standards. Network access policies may include rules determining whether an endpoint is allowed to connect to a network, what kind of connection the endpoint may have with the network (e.g., through which VLAN, if any; through which ports, etc.), what services and/or ports the endpoint may access on the network, what data the endpoint may access on the network, quality of service (QOS) settings, etc.

Setting network access policies can be performed in real-time, and/or at any suitable time in relation to any portion of the method.

Step S140 preferably includes setting network access policies according to rules determined by administrators (e.g., as shown in FIG. 7, at a provided security interface, etc.), but may additionally or alternatively include setting network access policies based on rules derived automatically (e.g., as part of Step S120). For example, Step S140 may include blocking network access for endpoints exhibiting a vulnerability discovered by Step S120 until administrator intervention is available. In another example, Step S140 can include setting a network access policy for a network based on endpoint health intelligence generated for an endpoint user device attempting to access the network.

Step S140 may include setting network access policies based on additional information, such as time and/or event count. For example, Step S140 may include setting a network access policy that allows a user with outdated software to access the network for 48 hours; the user is notified that he/she has 48 hours to update his/her software (after which point, the endpoint will be blocked if the software is not updated). Likewise, Step S140 may include setting a network access policy that allows a user with outdated software to login to the network a limited number of times before being blocked. However, network access policies can be set according to any suitable criteria. Further, setting network access policies can be performed in any suitable fashion.

The method of the preferred embodiment and variations thereof can be embodied and/or implemented at least in part as a machine configured to receive a computer-readable medium storing computer-readable instructions. The instructions are preferably executed by computer-executable components preferably integrated with an endpoint health monitoring service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for enforcing standards regarding security vulnerabilities for an endpoint user device associated with a user, the method comprising:
   at a remote server, implementing an inline frame;
   embedding the inline frame within a web application, wherein the web application operates independently of the remote server;
   using the inline frame embedded within the web application to transmit one or more health data probes from the remote server to the endpoint user device, the endpoint user device comprising an agentless endpoint user device with respect to the remote server, the one or more endpoint health data probes requesting current endpoint health data from the one or more non-agent applications or non-agent services operating with the endpoint user device;
   collecting, at the inline frame, the current endpoint health data of the endpoint user device in response to the user interfacing with the web application through the endpoint user device, wherein collecting the current endpoint health data comprises:
      in response to receiving the one or more health data probes, receiving, at the inline frame, an HTTP user-agent header comprising (i) a current operating system type and (ii) a current operating system version of the endpoint user device, wherein the endpoint health data comprises the operating system type and the operating system version;
   generating a comparison of the current endpoint health data of the end user device and endpoint health standards, the endpoint health standards comprising expected endpoint health data, wherein generating the comparison comprises:
      comparing the current operating system type and the current operating system version to an expected operating system type and an expected operating system version, the expected endpoint health data comprising the expected operating system type and the expected operating system version; and
   generating a second comparison of the current endpoint health data of the end user device and historic endpoint health data of the end user device, wherein generating the second comparison comprises:
      comparing the current operating system type and the current operating system version of the endpoint user device to historic endpoint health data of the endpoint user device;
   generating endpoint health intelligence from the comparison of the endpoint health data and the endpoint health standards, the endpoint health intelligence indicating endpoint security health of the endpoint user device;
   generating an endpoint health notification from the endpoint health intelligence; and
   notifying an administrator of a computer network with the endpoint health notification.

2. The method of claim 1, wherein the endpoint health data comprises endpoint operating system type and operating system version; wherein generating the endpoint health intelligence comprises generating the endpoint health intelligence based on the operating system type and the operating system version.

3. The method of claim 2, wherein collecting the endpoint health data comprises extracting, at the inline frame, the operating system type and the operating system version from an HTTP user-agent header.

4. The method of claim 1, wherein collecting the endpoint health data includes performing, at the inline frame, digital fingerprinting of the agentless endpoint user device to collect hardware properties of the agentless endpoint user device, the endpoint health data comprising the hardware properties.

5. The method of claim 1, wherein collecting the endpoint health data comprises collecting hardware properties of the agentless endpoint user device; wherein the method further comprises generating an endpoint device profile from the hardware properties; wherein generating endpoint health intelligence comprises generating endpoint health intelligence from the endpoint device profile.

6. The method of claim 1, wherein generating the endpoint health intelligence comprises generating the endpoint health intelligence from a comparison of the endpoint health data and endpoint health standards, the endpoint health standards comprising expected endpoint health data.

7. The method of claim 6 further comprising:
collecting security information related to a version of an application operating on the agentless endpoint user device; and
updating the expected endpoint health data based on the security information.

8. The method of claim 6, further comprising:
collecting, at the inline frame, second endpoint health data of a second endpoint user device in response to a second user interfacing with the web application through the second endpoint user device;
generating second endpoint health intelligence from the second endpoint health data;
generating a second endpoint health notification comprising the second endpoint health intelligence; and
notifying a second administrator of a second network with the second endpoint health notification.

9. The method of claim 8, further comprising:
receiving, from the second administrator, a flagging of the second endpoint health data as vulnerable; and
automatically updating the endpoint health standards with the second endpoint health data and the flagging.

10. The method of claim 6, wherein comparing the endpoint health data to the endpoint health standards comprises:
generating a vulnerability indication using a machine learning model generated from the endpoint health standards, wherein the vulnerability indication is associated with the endpoint health data, and wherein the first endpoint health notification comprises the vulnerability indication.

11. The method of claim 10, further comprising:
receiving, from the first administrator, verification of the vulnerability indication; and
updating the machine learning model with the endpoint health data and the verification.

12. The method of claim 11, further comprising receiving the verification at a security interface provided to the first administrator, the security interface accessible over the Internet.

13. The method of claim 6, wherein generating the first endpoint health notification comprises generating the first endpoint health notification comprising a vulnerability warning, in response to the endpoint health data failing to meet an endpoint health standard of the endpoint health standards.

14. The method of claim 1, wherein generating the endpoint health intelligence comprises generating a comparison between the endpoint health data of the agentless endpoint user device and second endpoint health data of a second endpoint user device, and wherein the first endpoint health notification comprises the comparison between the endpoint health data and the second endpoint health data.

15. The method of claim 14, wherein the second endpoint user device is associated with a second user.

16. The method of claim 1, wherein generating the endpoint health intelligence comprises identifying a security vulnerability associated with the endpoint health data, and wherein the first endpoint health notification comprises an indication of the security vulnerability.

17. The method of claim 1, wherein collecting the endpoint health data comprises collecting the endpoint health data without installing an agent on the agentless endpoint user device.

18. The method of claim 1, wherein the inline frame is used to authenticate the user, and wherein collecting the endpoint health data comprises collecting the endpoint health data only at the inline frame.

19. The method of claim 1, further comprising providing a security interface to the administrator, the security interface accessible over the Internet, wherein notifying the administrator comprises presenting, through a wireless communicable link with an administrator device associated with the first administrator, the first endpoint health notification at the security interface.

20. The method of claim 1, further comprising notifying the user with a second endpoint health notification comprising the endpoint health intelligence.

21. The method of claim 20, wherein notifying the user comprises notifying the user at the agentless endpoint user device through the inline frame.

22. The method of claim 1, wherein the agentless endpoint user device comprises an agentless entity with respect to the inline frame and the remote server.

23. The method of claim 1, wherein the endpoint health intelligence comprises an indication of an unrecognized vulnerability at the agentless endpoint user device,
wherein in response to detecting the unrecognized vulnerability at the agentless endpoint user device, automatically updating endpoint health standards of the computer network, and
wherein updating the endpoint health standards includes updating the computer network's access policies.

24. The method of claim 1, wherein when a property of the current endpoint health data fails to meet a corresponding endpoint health standard for that property, identifying a security vulnerability based on the property failing to meet the corresponding endpoint health standard.

25. The method of claim 1, wherein generating the endpoint health intelligence includes generating the endpoint health intelligence data after an amount of endpoint health data collected by the inline frame exceeds a threshold.

* * * * *